United States Patent
Sylvester et al.

(10) Patent No.: US 11,467,336 B1
(45) Date of Patent: Oct. 11, 2022

(54) FIBER OPTIC SWITCH EMPLOYING MOVEABLE STRUCTURE INTERACTION WITH THE EVANESCENT FIELD OF A CLADDING-REMOVED FIBER

(71) Applicant: General Dynamics Mission Systems, Inc., Fairfax, VA (US)

(72) Inventors: Garrett Sylvester, Fairfax, VA (US); David L. K. Eng, Fairfax, VA (US); M. Craig Swan, Fairfax, VA (US)

(73) Assignee: General Dynamics Mission Systems, Inc.

( * ) Notice: Subject to any disclaimer, the term of this patent is extended or adjusted under 35 U.S.C. 154(b) by 0 days.

(21) Appl. No.: 17/244,808

(22) Filed: Apr. 29, 2021

(51) Int. Cl.
*G02B 6/02* (2006.01)
*G02B 6/35* (2006.01)

(52) U.S. Cl.
CPC ......... *G02B 6/02061* (2013.01); *G02B 6/356* (2013.01); *G02B 6/3508* (2013.01)

(58) Field of Classification Search
CPC ... G02B 6/02061; G02B 6/3508; G02B 6/356
See application file for complete search history.

(56) References Cited

U.S. PATENT DOCUMENTS

| | | | | |
|---|---|---|---|---|
| 6,020,986 | A * | 2/2000 | Ball | H04J 14/0212 398/1 |
| 6,801,690 | B1 * | 10/2004 | Ling | G02B 6/12007 398/87 |
| 6,842,563 | B2 | 1/2005 | Zhang et al. | |
| 6,973,231 | B2 * | 12/2005 | Zhang | H04Q 11/0005 385/24 |
| 6,996,316 | B2 * | 2/2006 | Bailey | G02B 6/2821 372/6 |
| 7,003,190 | B2 * | 2/2006 | Zhang | H04Q 11/0005 385/16 |
| 2002/0191879 | A1 * | 12/2002 | Liu | G02B 6/02085 385/37 |
| 2002/0197037 | A1 * | 12/2002 | Bailey | H01S 3/0675 385/127 |
| 2003/0077025 | A1 * | 4/2003 | Zhang | G02B 6/124 385/16 |

(Continued)

OTHER PUBLICATIONS

Dong, L., et al., "Novel add/drop filters for wavelength-division-multiplexing optical fiber systems using a Bragg grating assisted mismatched coupler." IEEE Photonics Technology Letters 8.12 (1996): 1656-1658.

*Primary Examiner* — Andrew Jordan
(74) *Attorney, Agent, or Firm* — LKGlobal | Lorenz & Kopf, LLP

(57) ABSTRACT

Cladding removed from a portion of the optical fiber defines a window exposing the fiber core. A grating having a substantially periodic structure defining a wavelength is moveably positioned in the window, where it can interact with the evanescent field present in the window when optical power is propagating through the fiber. An adjustable positioning fixture holds the grating proximate to the window and operates to change the relative spacing of the fiber core and grating, between: a first position in which the grating is held proximate to the fiber core and substantially interacts with the evanescent field, and a second position in which the grating is held apart from the fiber core and does not substantially interact with the evanescent field.

15 Claims, 3 Drawing Sheets

(56) References Cited

U.S. PATENT DOCUMENTS

| | | | | |
|---|---|---|---|---|
| 2003/0077031 A1* | 4/2003 | Zhang | ................... | G02B 6/124 |
| | | | | 385/24 |
| 2003/0123798 A1* | 7/2003 | Zhang | ................ | H04Q 11/0005 |
| | | | | 385/24 |
| 2003/0168939 A1* | 9/2003 | Talebpour | ............. | G02F 1/0134 |
| | | | | 310/328 |
| 2004/0228574 A1* | 11/2004 | Chen | .................. | G02B 6/12007 |
| | | | | 385/27 |
| 2006/0039647 A1* | 2/2006 | Ling | ................. | G02B 6/12007 |
| | | | | 385/24 |
| 2017/0370697 A1* | 12/2017 | Sasaki | ............... | G01B 9/02015 |
| 2020/0048428 A1* | 2/2020 | Swan | ................... | C09B 69/105 |

* cited by examiner

FIBER OPTIC SWITCH EMPLOYING MOVEABLE STRUCTURE INTERACTION WITH THE EVANESCENT FIELD OF A CLADDING-REMOVED FIBER

TECHNICAL FIELD

This disclosure relates generally to fiber optic communication. More particularly, the disclosure relates to a wavelength selective fiber optic switch.

BACKGROUND

This section provides background information related to the present disclosure which is not necessarily prior art.

Modern fiber optic communication systems send data over many different channels corresponding to different optical wavelengths. To control individual channels, such as to switch a channel on and off, high-fidelity wavelength-selective switches are needed in order to control the desired channel without affecting the channels at other wavelengths.

To achieve this, conventional wavelength-selective optical switches typically comprise separate physical devices that are inserted into the optical path. The conventional approaches can be convoluted, expensive, physically large, challenging to integrate and come with various performance tradeoffs (insertion loss, tunability challenges and the like).

SUMMARY

The disclosed technology takes a different approach to providing a wavelength-selective optical switch. The optical switch is small in size and offers low insertion loss. The optical fiber is fashioned by removing a portion of the cladding, as by polishing, abrading or other removal processes, to define an access window through which the air glass interface is brought nearer the core. Within the window region, the evanescent field is accessible.

A grating, sized to moveably fit into the access window, is provided with a predetermined grating pitch corresponding to the wavelength desired to be switched. The grating and optical fiber are physically joined by a fixture that supports relative movement between fiber and grating between a first position in which the grating contacts the core, or is otherwise positioned proximate to the core, such that the grating electromagnetically interacts with the evanescent field of the core and a second position in which the grating is spaced apart from the core.

While a range of mechanical movement solutions are possible, the fixture may be provided with an electrically actuated piezoelectric piston to move between the first and second positions.

When switched to the first position, the grating substantially interacts with the evanescent field. As a result of this interaction, the optical power at the design wavelength is prevented from propagating further in the forward direction—effectively switching OFF the optical signal at the design wavelength.

When switched to the second position, the grating is substantially non interacting with the evanescent field within the window. In this state, the optical power, at all wavelengths present, propagates through the optical fiber with near zero insertion loss. The energy in the evanescent field, though outside of the fiber core, remains bound to the fiber mode and does not result in any power attenuation unless perturbed by an externally introduced object.

Therefore, in one respect the wavelength selective fiber optic switch employs an optical fiber having a fiber core and a cladding. A portion of the cladding is removed to define a window that supports access to the evanescent field that is present when optical power is propagating through the optical fiber.

The switch also employs a grating configured to define a grating wavelength (Λ), and an adjustable positioning fixture configured to hold the grating proximate to the window and operable to change the relative spacing of the fiber core and grating, between the first and second position. In the first position the grating is held proximate to the fiber core and substantially interacts with the evanescent field. In the second position the grating is held apart from the fiber core and substantially eliminates interaction with the evanescent field.

The cladding-removed portion of the fiber core and the grating cooperatively define a switch that operates in the first position, to substantially impede propagating optical power in the optical fiber at the grating wavelength; and in the second position, to permit propagating optical power in the optical fiber at the grating wavelength.

In another respect, a method is disclosed for switching an optical signal carried by optical energy propagating through an optical fiber having a core and a cladding.

Propagating optical energy is introduced into an optical fiber that has a portion of the cladding removed to define a window for accessing the evanescent field when the optical energy is present in the optical fiber. The optical energy is modulated at a predefined wavelength to carry the optical signal. The relationship between optical wavelength and grating periodicity is expressed in the Bragg equation:

$$\lambda_B = 2\Lambda n_{\text{eff}}$$

Here $\lambda_B$ is the Bragg wavelength (our selected wavelength), $\Lambda$ is the period or pitch of the physical grating, and $n_{\text{eff}}$ is the effective index of refraction. Note that the above equation is for the first order grating response, higher orders exist and could also be used in this application. A grating having a defined period is (a) selectively introduced into the evanescent field, such that interaction between the grating and the evanescent field results in suppression of power at the Bragg wavelength from the transmitted spectra. The grating is (b) selectively moved substantially out of the evanescent field such that substantial interaction between the grating and the evanescent field does not occur at the Bragg, or other wavelengths. Through such selective movement of the grating into and out of proximity with the evanescent field the optical signal is switched OFF when the grating is interacting and switched ON when the grating is not interacting.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figure 1:
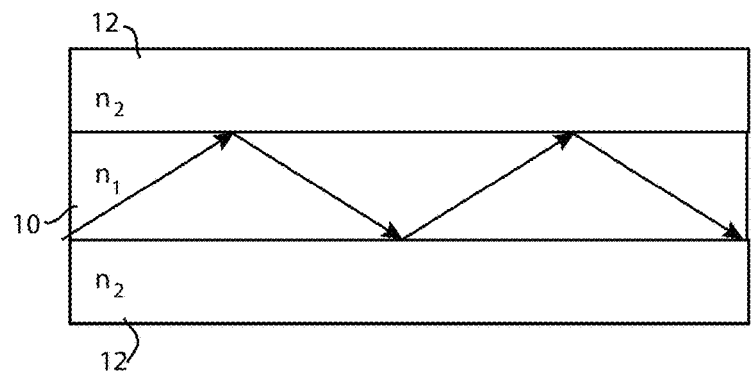
FIG. 1 is a cross section of an optical fiber, useful in understanding the concept of total internal reflection.

To a first approximation, an optical fiber may be thought of as propagating optical power by means of total internal reflection at the boundary between the core and cladding. The concept is illustrated in FIG. 1 in which the core 10 and cladding 12 have different refractive indices $n_1$ and $n_2$. Specifically, the cladding has a slightly lower index of refraction ($n_2$) than the core ($n_1$). Thus the propagation velocity of the light is slower in the core than in the cladding.

As illustrated, a light ray is injected into the optical fiber on the left. If the light ray is injected and strikes the core-to-cladding interface at an angle greater than the critical angle with respect to the axis normal to the core-clad interface, it is reflected back into the core. Because the angle of incidence is always equal to the angle of reflection, the reflected light continues to be reflected. The light ray then continues bouncing down the length of the optical fiber. If the angle of incidence at the core-to-cladding interface is less than the critical angle, both reflection and refraction take place. Because of refraction at each incidence on the interface, the light beam attenuates and dies off over a certain short distance.

As anyone who has used a prism or studied a rainbow knows, visible daylight, which we might perceive as white, actually contains a spectrum of colors ranging from red to violet (and this is just what the human eye can see). Each of these colors represents a different optical wavelength. In a fiber optic communication system these different wavelengths can be treated as different channels (though a wavelength range different from the visible is used in most communication systems), and thus capable of carrying different communication messages.

Although FIG. 1 has illustrated the propagating optical signal as a light ray, the physics of light propagation is actually more complex. Light is composed of photons, which carry the electromagnetic force. The cumulative effect of many photons can be represented as electromagnetic fields, specifically the electric field and the magnetic field, which exhibit wave properties as the light propagates. Also produced is an evanescent field, which is important to the operation of the optical switch, as will be discussed more fully below in connection with FIG. 10.

Figure 2:
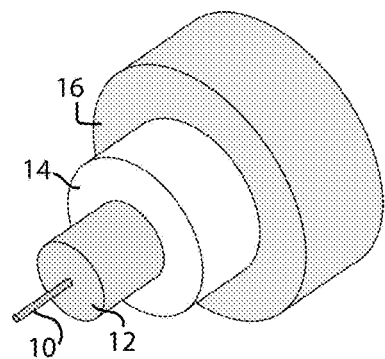
FIG. 2 is a perspective view of an exemplary single-mode optical fiber, encased in a protective buffer coating and outer jacket.

FIG. 2 illustrates an exemplary optical fiber with the core 10 and cladding 12. As discussed above, it is the interface or boundary condition between the core and cladding that is responsible for guiding the optical power through total internal reflection. These optical fibers are typically fabricated from glass that has been suitably doped to exhibit the desired refractive index. For use in a typical communication system, a practical optical fiber would also include protective buffer coating 14 and an outer jacket 16. These additional layers strengthen the cable to permit bending without breaking the core or cladding, and also to protect against abrasion. For convenience of illustration, these outer buffer coating and jacket layers have not been shown in the remaining figures.

Cladding-Removed Optical Fiber

Figure 3:
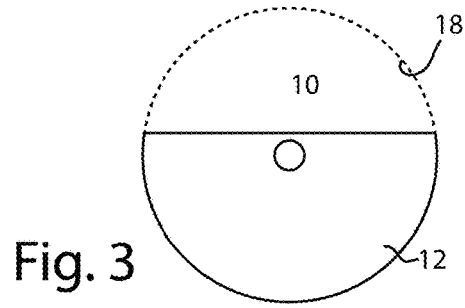
FIG. 3 is an endwise, cross sectional view of the core and cladding portion of a single mode optical fiber, illustrating how the optical fiber is fashioned with a cladding-removed window that exposes the core.
Figure 4:
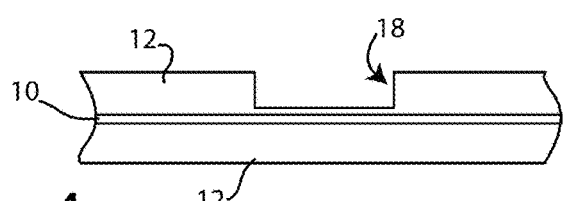
FIG. 4 is a longitudinal, cross sectional view of the optical fiber of FIG. 3, illustrating how the cladding-removed window is defined.

Referring to FIGS. 3 and 4, a window 18 is fashioned in the optical fiber by removing the cladding 12 as by side polishing or abrading, to expose the core 10. In one embodiment, as illustrated, the core is not fully 'exposed' after cladding removal, in that there is generally a small remaining layer of cladding between the core and air. This remaining cladding layer is thin enough that the evanescent field can interact with what is on the other side. Thus in the window region the core 10 is nearer the glass air interface. In an alternate embodiment, polishing or abrading may extend fully into the core, thereby exposing the core to air. In both embodiments, due to the comparatively small size of the window 18 relative to the remaining surface area of the optical fiber, the window alone (absent effects of inserted grating discussed below) represents only a slight discontinuity, producing negligible overall power loss through the optical fiber.

Moveable Grating that Interacts with the Evanescent Field

Figure 7:
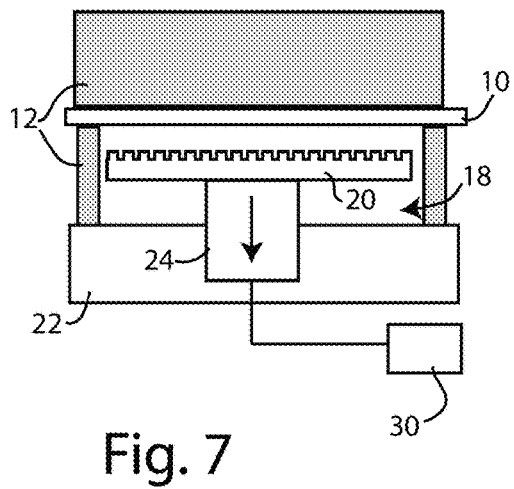
FIG. 7 is a cross section of the cladding-removed portion of the optical fiber and grating, illustrating a fixture for selectively adjusting the core-grating spacing, FIG. 7 showing the spaced apart position.
Figure 8:
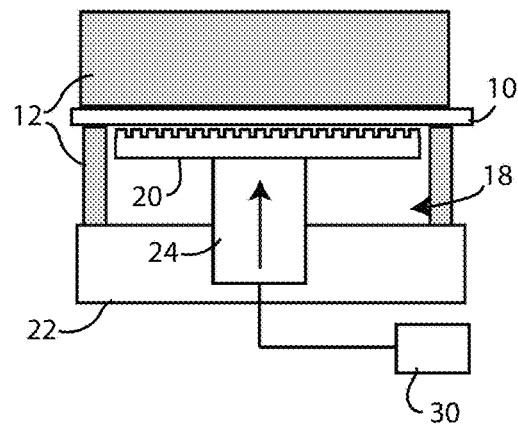
FIG. 8 is a cross section of the cladding-removed portion of the optical fiber and grating, illustrating a fixture for selectively adjusting the core-grating spacing, FIG. 8 showing the closed position.

In addition to the cladding-removed optical fiber section, the switch also includes a grating 20, sized to fit within window 18, to allow movement away from and into proximity with the cladding-removed optical fiber section as shown in FIGS. 7 and 8 respectively. By virtue of its repeating geometry, the grating induces a periodic effective-index change in the fiber, when placed in proximity with the fiber core. The periodicity of this change in effective index defines the optical wavelength, known as the Bragg wavelength, at which the grating will interact most strongly with optical power contained in the fiber core. While a stepped profile has been illustrated in the figures, switching may be achieved using gratings featuring other profiles, such as sawtooth (blazed) profiles, sinusoidal profiles, chirped profiles, apodized profiles and other profiles that need not be strictly periodic.

Figure 5:
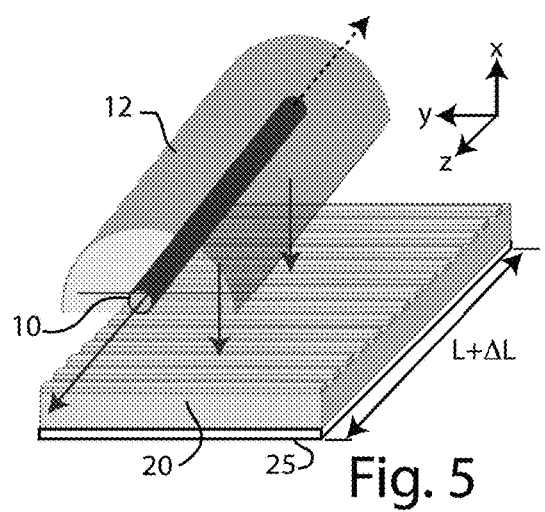
FIG. 5 is a perspective view of the cladding-removed portion of the optical fiber, shown in spatial relation to the grating.
Figure 6:
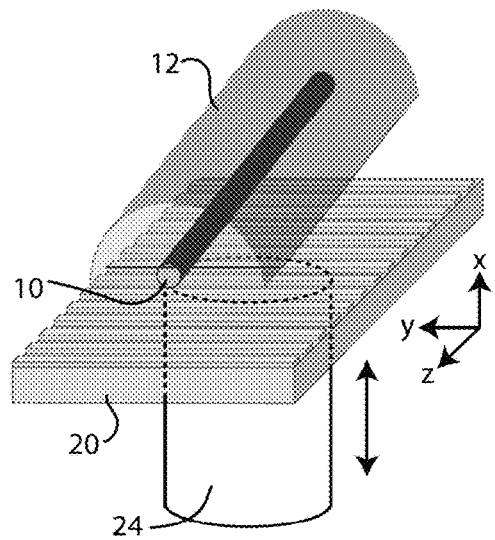
FIG. 6 is a perspective view of the cladding-removed portion of the optical fiber, and further diagrammatically illustrates a piston movement fixture.

As illustrated diagrammatically in FIGS. 5 and 6, the grating is configured for relative movement in a first direction, towards and away from the optical fiber (in the x-direction). Such movement selectively removes (FIG. 7) and introduces (FIG. 8) interaction between the grating and the evanescent field produced by optical energy within the window region. Such movement is provided by a suitable mechanical device such as an electrically actuated piezoelectric piston 24.

Figure 10:
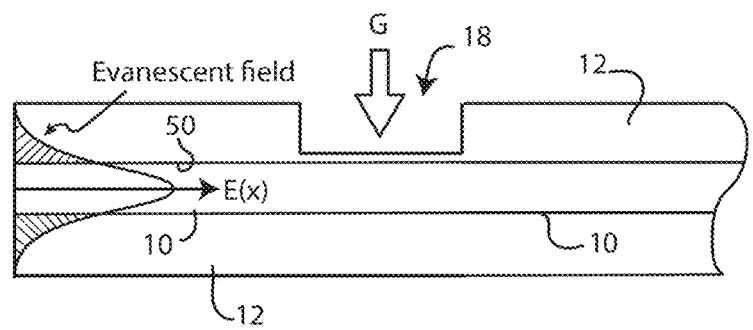
FIG. 10 is a graphical representation of the evanescent field shown in relation to an optical fiber having a cladding-removed portion at which the evanescent field may interact with a grating.

FIG. 10 diagrammatically illustrates the nature of this evanescent field. FIG. 10 depicts the optical fiber core 10 and cladding 12 with window 18 where the grating may be positioned to interact with the evanescent field as at G. The optical power propagates from left to right in FIG. 10, as an electromagnetic wave guided by the boundary 50 between core and cladding. The propagating electromagnetic wave comprises reciprocally related, time varying electric and magnetic fields, the vector cross product of which defines the directional energy flux (the energy transferred by the optical power per unit area per unit time). This relationship is described by the Poynting vector S (a vector quantity), where E is the electric field vector, H represents the magnetic field vector and X represents the cross product operator:

$S=E \times H$

This propagating electromagnetic wave travels at the speed of light (with suitable correction for the permeability and permittivity of the medium through which the wave travels). This propagating wave can travel great distances—as visible starlight will attest. As the wave propagates, the E-field and H-field remain in the same relationship. They are reciprocally related and oriented spatially at right angles to each other.

The evanescent field is of a fundamentally different character than the reciprocally related propagating electromagnetic E- and H-fields. The evanescent field is predominately a near field phenomenon and rapidly decays to zero in the direction normal to the fiber axis with increasing distance from the core-clad boundary. Specifically, the evanescent field has a rapidly decaying field amplitude that exists outside the fiber core. Thus, suitably configured objects placed in the evanescent field can interact with the evanescent field and reflect energy at certain wavelengths back towards the energy source. This is essentially what the grating does, when placed within the evanescent field.

Figure 9:
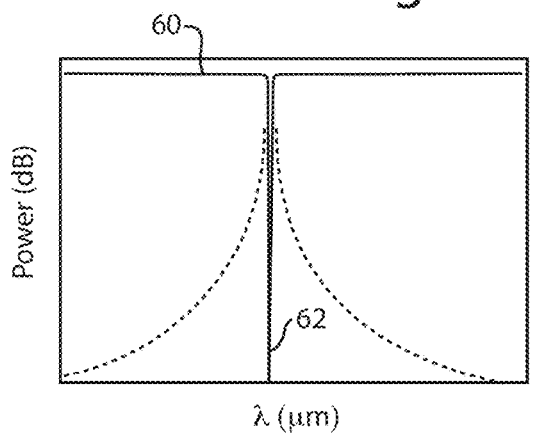
FIG. 9 is a graph of optical power transmission vs wavelength, illustrating the switching effect of the disclosed optical switch; the solid line represents the forward power and the dotted line depicts the redirected or back-reflected power.

When the grating is placed in the evanescent field, light rays at the Bragg wavelength will interact with the grating and be redirected from the forward propagating mode, thereby substantially removing that wavelength from optical power propagating in the forward direction through the optical fiber. This can be seen graphically in FIG. 9, where the forward propagating optical power is shown by the solid line. This rapid drop occurs at the grating (i.e., Bragg) wavelength. The dotted line depicts the redirected or back-reflected power, which is seen to rise rapidly as the wavelength approaches the grating wavelength, and then to fall rapidly once the grating wavelength is passed.

Thus at the grating wavelength, the grating will selectively turn off, or divert, a forward-propagating optical signal of the same wavelength, as defined by the Bragg equation, when the grating is touching or in very near proximity to the surface of the core (i.e. coupled to the evanescent field). When the grating is lifted away from the core until it is out of the evanescent field, the grating has virtually no effect on optical signals propagating in the optical fiber. The distance required to switch between the on and off states can be quite small. In a single mode optical fiber, the distance to move the grating between the ON and OFF state is on the order of a micron.

Grating Tunability

If desired, the grating may also be manufactured to expand and contract (in the z-direction of FIGS. 5 and 6) to change the grating period $\Lambda$ and thereby change the selected switching wavelength. Such expansion and contraction may be effected by physically stretching or contracting the length of grating in a direction orthogonal to the grating, by an amount $\Delta L$, which can be either positive or negative, and is depicted in FIG. 5. The untuned grating length is $L=N\Lambda$ where N is the number of grating periods and remains unchanged by stretching or compression. Therefore, stretching or compressing the grating to a length of $L+\Delta L$ corresponds to a grating period of $\Lambda+\Delta\Lambda$, which translates to a new selected wavelength of $\lambda+\Delta\lambda$. Tunability may be provided for example by employing a heating and/or cooling device in thermal contact with the grating to produce expansion and contraction of the grating. Alternatively, or additionally, a mechanical stretcher or compressor may be used. By expanding or stretching the grating, a longer wavelength is selected; by contracting or compressing, a shorter wavelength is selected. A thermal device 25 is illustrated in FIG. 5 as an example. Tuning through a range of different grating periods may also be accomplished by rotation of the grating relative to the fiber, and/or by changing the refractive index of the material of which the grating is made.

Figure 11A:
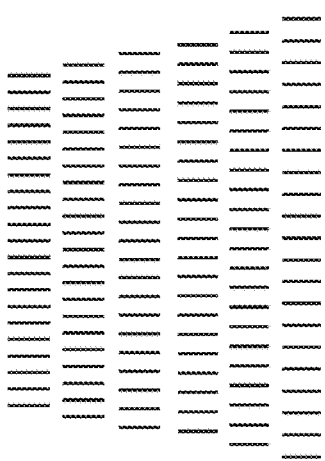
FIGS. 11a and 11b illustrate further techniques for tuning the grating.
Figure 11B:
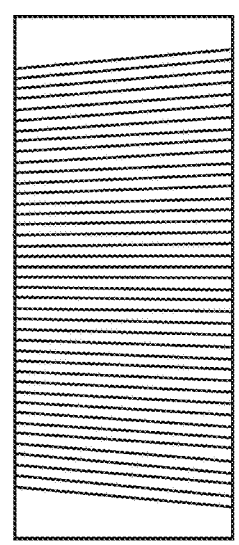

In another tuning approach, the period of the grating would be different depending on location on the grating—either varying in the longitudinal direction (known as chirp); or laterally which would either be multiple gratings fabricated side-by-side with varying periods as shown in FIG. 11a, or something continuous as shown in FIG. 11b.

Details of Exemplary Embodiment

FIGS. 7 and 8 illustrate the mechanics of an exemplary optical switch utilizing the cladding-removed fiber and grating techniques discussed above. FIG. 7 shows the grating 20 positioned within window 18 in a spaced-apart relation to the core 10. In this position, the optical power at all wavelengths flows through the optical fiber, guided by the boundary between core 10 and cladding 12, in the zero insertion loss condition illustrated at 60 in FIG. 9.

FIG. 8 shows the same grating 20, in a contacting or near contacting relation to the core 10. In this position, the optical power at the Bragg wavelength is substantially switched off (greatly attenuated) as illustrated at 62 in FIG. 9.

Movement between the FIG. 7 and FIG. 8 positions is effected by electrically actuating the piezoelectric piston 24. This mechanical movement-producing device is secured to the optical fiber by fixture 22 and is electrically switched between its respective contracted and elongated positions by an electronic control circuit 30, which selectively supplies electrical power to the piezoelectric device. If desired, the grating expansion-contraction mechanism, such as thermal device 25 (shown in FIG. 5) may be included and controlled by circuit 30.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A wavelength selective fiber optic switch, comprising:
   an optical fiber having a fiber core and a cladding,
   a portion of the cladding being removed to define a window facilitating access to the evanescent field present when optical power is propagating through the optical fiber;

a grating configured to define a grating period corresponding to an optical wavelength;

an adjustable positioning fixture configured to hold the grating proximate to the window and operable to change the relative spacing of the fiber core and grating, between:

a first position in which the grating is held proximate to the fiber core and substantially interacts with the evanescent field, and a second position in which the grating is held apart from the fiber core and does not substantially interact with the evanescent field, the cladding-removed portion of the fiber core and the grating cooperatively defining a switch that operates:

in said first position, to substantially impede propagating optical power in the optical fiber at the Bragg wavelength; and in said second position, to permit propagating optical power in the optical fiber at the optical wavelength and all other wavelengths naturally supported by the unperturbed optical fiber.

2. The optical switch of claim 1 wherein the adjustable positioning fixture includes an electro-mechanical actuator that changes the relative spacing of the fiber core and grating.

3. The optical switch of claim 1 wherein the adjustable positioning fixture includes a mechanical actuator that changes the relative spacing of the fiber core and grating.

4. The optical switch of claim 1 wherein the adjustable positioning fixture includes an electrically operated piezoelectric actuator that changes the relative spacing of the fiber core and grating.

5. The optical switch of claim 1 wherein the grating is tunable through a range of different grating periods.

6. The optical switch of claim 1 wherein the grating is tunable through a range of different grating periods using a mechanism that changes a dimension of the grating by stretching or compressing.

7. The optical switch of claim 1 wherein the grating is tunable through a range of different grating periods through expansion and contraction of the grating by varying the temperature of the grating.

8. The optical switch of claim 1 wherein the grating is tunable through a range of different grating periods through rotation of the grating relative to the fiber.

9. The optical switch of claim 1 wherein the evanescent field has a rapidly decaying field amplitude that exists outside the fiber core.

10. A method of switching an optical signal carried by optical energy propagating through an optical fiber having a core and a cladding comprising:

introducing propagating optical energy into an optical fiber that has a portion of the cladding removed to define a window supporting an evanescent field when the optical energy is present in the optical fiber;

modulating the optical energy at a predefined wavelength to carry the optical signal;

selectively introducing a grating having a defined grating period corresponding to the predefined optical wavelength into the evanescent field such that interaction between the grating and the evanescent field results in switching at the optical wavelength corresponding to the grating period according to the Bragg equation; and selectively moving the grating substantially out of the evanescent field such that substantial interaction between the grating and the evanescent field does not occur;

using the selective movement of the grating into and out of proximity with the evanescent field to switch the optical signal OFF when the grating is in proximity and ON when the grating is out of proximity.

11. The method of claim 10 wherein the grating wavelength is associated with a physical property of the grating and further comprising tuning the physical property of the grating to change the grating wavelength.

12. The method of claim 10 wherein the grating wavelength is associated with a periodic property of the grating and further comprising tuning the periodic property of the grating to change the grating wavelength.

13. The method of claim 10 wherein the grating wavelength is associated with a periodic pitch of the grating and further comprising tuning the pitch of the grating to change the grating wavelength.

14. The method of claim 13 wherein the pitch of the grating is tuned by effecting a physical change to the grating selected from the group consisting of: stretching, compressing, expanding, contracting, heating, cooling, rotating and changing the refractive index of the grating material.

15. The method of claim 13 wherein the period of the grating is varied either along the axis of optical propagation (chirped) or normal to the axis of optical propagation such that the Bragg wavelength can be tuned based on the location on the grating with which the cladding-removed fiber window makes contact.

* * * * *